United States Patent [19]
Buhrer et al.

[11] Patent Number: 6,028,656
[45] Date of Patent: *Feb. 22, 2000

[54] OPTICAL POLARIZATION SWITCH AND METHOD OF USING SAME

[75] Inventors: Carl F. Buhrer, Farmington; Peter J. Miller, Somerville, both of Mass.

[73] Assignee: Cambridge Research & Instrumentation Inc., Boston, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,966

[22] Filed: Oct. 9, 1997

Related U.S. Application Data

[60] Provisional application No. 60/027,974, Oct. 9, 1996.

[51] Int. Cl.$^7$ .................................................. G02F 1/13
[52] U.S. Cl. ........................... 349/196; 349/74; 349/117; 349/119
[58] Field of Search ............................... 349/74, 117, 75, 349/119, 196

[56] References Cited

U.S. PATENT DOCUMENTS

| | | | |
|---|---|---|---|
| 3,881,808 | 5/1975 | Gurtler et al. | 350/160 |
| 4,239,349 | 12/1980 | Scheffer | 349/117 |
| 4,385,806 | 5/1983 | Fergason | 350/347 |
| 4,408,839 | 10/1983 | Wiener-Avnear | 350/347 |
| 4,436,376 | 3/1984 | Fergason | 350/332 |
| 4,436,379 | 3/1984 | Funada et al. | 349/75 |
| 4,448,489 | 5/1984 | Sato et al. | 350/330 |
| 4,466,702 | 8/1984 | Wiener-Avnear et al. | 350/347 |
| 4,497,542 | 2/1985 | Kaye | 350/335 |
| 4,516,837 | 5/1985 | Soref et al. | 350/347 |
| 4,540,243 | 9/1985 | Fergason | 350/337 |
| 4,582,396 | 4/1986 | Bos et al. | 350/347 |
| 4,583,825 | 4/1986 | Buzak | 350/335 |
| 4,770,500 | 9/1988 | Kalmanash et al. | 350/347 |
| 4,813,770 | 3/1989 | Clerc et al. | 349/74 |
| 4,842,379 | 6/1989 | Oishi et al. | 349/74 |
| 5,124,818 | 6/1992 | Conner et al. | 349/75 |
| 5,126,866 | 6/1992 | Yoshimizu et al. | 359/63 |
| 5,126,868 | 6/1992 | Kizaki et al. | 359/86 |
| 5,126,869 | 6/1992 | Lipchak et al. | 349/117 |
| 5,132,826 | 7/1992 | Johnson et al. | 359/93 |
| 5,175,638 | 12/1992 | Kanemoto et al. | 359/73 |
| 5,179,457 | 1/1993 | Hirataka et al. | 359/73 |
| 5,187,603 | 2/1993 | Bos | 359/73 |
| 5,221,978 | 6/1993 | Heyndericks et al. | 359/53 |
| 5,315,420 | 5/1994 | Narutaki et al. | 349/75 |
| 5,337,174 | 8/1994 | Wada et al. | 359/73 |
| 5,359,409 | 10/1994 | Wildnauer et al. | 356/334 |
| 5,375,006 | 12/1994 | Haas | 359/73 |

(List continued on next page.)

OTHER PUBLICATIONS

"Optics and Nonlinear Optics of Liquid Crystals", Chapter 2, written by Wu and Khoo, World Press, pp. 106–148 (1993).

"Optical Waves in Crystals", written by Yariv and Yeh, Wiley–Interscience, NY, pp. 54–154 (1984).

"Principles of Optics", written by Born and Wolf, Pergamon Press, Oxford, pp. 23–32 (1980).

Article entitled "Achromatic Retardation Plates" written by Title and Rosenberg, SPIE vol. 307, pp. 120–125 (1981).

Article entitled Achromatic Combinations of Half–Wave Plates, written by Charles J. Koester, J. Optical Society of America, vol. 49, No. 4, pp. 405–409 (Apr. 1959).

*Primary Examiner*—William L. Sikes
*Assistant Examiner*—Tarifur R. Chowdhurry
*Attorney, Agent, or Firm*—Cohen, Pontani, Lieberman & Pavane

[57] ABSTRACT

An improved optical polarization switch which provides a wide field-of-view and achromatic action. Two liquid crystal cells are used and are selectively operated in a preferred embodiment to provide three distinct optical states. Interposed between the two nematic liquid crystal cells is a compensating member such as an half-wave retarder or an optical rotator. Such switches are of utility in shutter applications and in high-performance field-sequential color filters.

20 Claims, 8 Drawing Sheets

U.S. PATENT DOCUMENTS

| | | | |
|---|---|---|---|
| 5,380,459 | 1/1995 | Kanemoto et al. | 252/299.01 |
| 5,400,158 | 3/1995 | Ohnishi et al. | 359/73 |
| 5,410,422 | 4/1995 | Bos | 359/73 |
| 5,440,413 | 8/1995 | Kikuchi et al. | 359/73 |
| 5,473,465 | 12/1995 | Ye | 359/426 |
| 5,523,867 | 6/1996 | Akatsuka et al. | 359/73 |
| 5,528,393 | 6/1996 | Sharp et al. | 359/53 |
| 5,576,861 | 11/1996 | Abileah et al. | 349/117 |
| 5,583,674 | 12/1996 | Mosley | 349/74 |
| 5,627,666 | 5/1997 | Sharp et al. | 349/74 |
| 5,710,609 | 1/1998 | Shimada | 349/126 |
| 5,715,029 | 2/1998 | Fergason | 349/196 |
| 5,737,047 | 4/1998 | Sakamoto et al. | 349/119 |
| 5,822,021 | 10/1998 | Johnson et al. | 348/742 |
| 5,870,159 | 2/1999 | Sharp | 349/121 |

OPTICAL POLARIZATION SWITCH AND METHOD OF USING SAME

This application claims the benefit of Provisional Application Ser. No. 60/027,974 filed Oct. 9, 1996.

BACKGROUND OF THE INVENTION

1. Field of the Invention

The present invention relates to optical polarization switches used to switchably transform the polarization state of light.

2. Description of the Related Art

Optical polarization switches are widely used. Commercially available optical polarization switches include Pockels cells and Kerr cells, which subject solid crystals or liquid media such as nitrobenzene to large applied voltages (>1 kV) to obtain switching action via linear or quadratic electro-optic effects, respectively.

More common, and considerably more economical, are switches based on the electric field reorientation of polar molecules including those of the cyano-biphenyl group in liquid crystal (LC) cells such as the twisted nematic (TN) cell, the supertwisted nematic (STN) cell, and the electrically controlled birefringence (ECB) cell. These are ubiquitous in digital indicators and flat panel displays. The principles of operation and construction methods for such devices are described in *Linear and Nonlinear Optics of Liquid Crystals*, by S. T. Wu and I. C. Khoo (World Press, 1993).

Some switches incorporate integral polarizers, while other switches simply modulate the polarization state of light and the polarization modulation is then converted to an intensity change by means of external polarizer elements. In either case, the quality of switch action depends on the completeness of the modulation or polarization change; the degree to which it is achromatic, or works equally for all colors of light; the efficiency, or freedom from absorption or other loss; and the field-of-view, or range of angles over which the switch performs well. Other concerns include cost, ease-of-manufacture, and speed of response.

Fergason, in U.S. Pat. No. 4,385,806, teaches the use of two fixed retarders, each having retardance less than or equal to that of a liquid crystal element, located adjacent to the entrance polarizer of a TN liquid crystal cell, to increase the field-of-view. The two retarders are oriented with their slow axis parallel and perpendicular, respectively, to the polarizer; this, in turn, is parallel to the director of the LC device at the side adjacent to the polarizer. In another construction retarders are arranged on opposite faces of the cell, at 45° relative to the director axis as it appears at each face. None of these elements are achromatic and they tend to exhibit only moderate field-of-view.

This same patent teaches the 'surface mode' of operation for ECB cells, an enhancement which provides increased response speed by use of a thick cell, used over only a portion of its range. While the surface mode ECB cell offers increased speed, relative to a TN cell, the use of a thick liquid crystal layer compromises its field-of-view. Fergason teaches reducing the field-of-view loss by placing two retarders adjacent to the surface mode liquid crystal device. The result is that some of the diminished field-of-view is recovered but still limited and the switch action is not achromatic.

Gurther and Wechler, in U.S. Pat. No. 3,881,808, teach shutter systems employing two TN cells in series. The twist sense and rotational orientation of the two cells is unspecified. By using two cells, a rapid response is obtained for both the rise and fall time, as sought, e.g., for camera applications. However, unless the cells have an opposite sense of twist, and a particular orientation relative to one another, this switch multiplies the chromatic error of the individual cells and offers poor field-of-view for a similar reason. Even in the best case, only the off or undriven state is improved. When both cells are driven, significant leakage is exhibited in this switch for off-axis rays.

Wiener-Avnear, in U.S. Pat. No. 4,408,839, shows a TN device compensated for the polarization ellipticity of the exiting light by the addition of a second TN device with opposite twist sense oriented so that the exit director is orthogonal to the entrance director of the cell being compensated. This second cell is not driven electrically. Normally, a TN cell has significant chromatic error in the off state, but in the on or driven state is nearly achromatic. The Wiener-Avnear switch reverses this, in that the switch is nearly achromatic in the off state, and has an improved field-of-view, but suffers large chromatic errors and field-of-view limits in the on state. Also, this switch construction requires TN cells with both left- and right-handed twist which is undesirable in manufacture.

Kizaki et. al., in U.S. Pat. No. 5,126,868, teach a display comprising an STN cell with a twist helix angle of 160° to 270° arranged in series with a 90° TN cell having an opposite sense of twist. Only the STN cell is electrically driven and the 90° TN cell acts as a passive compensating layer to correct color errors developed in the STN cell. As a result, the usual compensating film employed with STN cells is omitted. Crossed polarizers are used with the entrance polarizer axis oriented at an angle of 35° to 50° to the director of the STN cell. The cell thickness d and the birefringence δn are chosen so that d·δn for the compensating cell is less than d·δn for the electrically driven cell. Only modest field-of-view and efficiency are obtained by this switch.

Heynderickx et. al., in U.S. Pat. No. 5,221,978, teach two TN cells arranged in series with an integral polarizer therebetween. This provides rotationally symmetric iso-contrast curves which improves the useful field-of-view in some applications. Thin construction methods are taught to avoid ghost images. Although this construction offers improved contrast relative to the Gurther and Wechler switch, inherent losses are present. First, there is absorption of 10% or more due to the extra polarizer layer. Second, the radial performance is degraded since the technique involves orienting the two cells so that the low-transmission quadrant of one cell is superimposed upon the high-transmission quadrant of the other cell. This insures that, for any viewing angle, at least one cell exhibits poor transmission. As a result, the patented switch provides poor, but rotationally symmetric, off-axis response.

Funada, Kozaki, Matsura, and Wada describe a type of TN display with improved field-of-view in U.S. Pat. No. 4,436,379. This display comprises two LC devices in series with unspecified twist sense and relative orientation. Both devices are driven, and in the preferred embodiment, one has about 10% less retardance than the other. There is no clear teaching of any mechanism which might yield an improved field-of-view.

Sato and Shibuya, in U.S. Pat. No. 4,448,489, describe a display consisting of a dot-matrix element laminated with a segment element to achieve improved viewing quality relative to a dot-matrix display. Although the patent specifies values for total cell retardance in each element, the improvement is not related to birefringence cancellation of the type mentioned by Wiener-Avnear or Funada et. al. It does not provide an improved field-of-view per se, but does provide for cancellation of shadows and the displacement of reflected images as they pass through the thickness of the display.

Wiener-Avnear and Grinberg, in U.S. Pat. No. 4,466,702, disclose an undriven LC retarder used to compensate an ECB display. The compensating retarder is oriented with its slow axis perpendicular to the ECB device. The goal is to yield a net retardance of 0 for on-axis rays when the ECB device is undriven so as to obtain increased contrast. This patent does not address off-axis response, which is probably degraded.

Kaye teaches, in U.S. Pat. No. 4,497,542, two ECB devices arranged with the slow axes of each parallel to one another and the tilt angles in mirror symmetry about the cell normal to yield improved off-axis response, particularly for rays in the plane of the bent director when partially driven. The two cells are driven by the same voltage so as to best cancel one another for off-axis rays. While this construction is an improvement over simple ECB devices it still has a very limited field-of-view and, being a retarder element, is not an achromatic switch.

Bos et. al. teach the construction of a liquid crystal ECB cell, in U.S. Pat. No. 4,582,396, with opposed tilt sense at opposite faces. After a period of time with no voltage applied, the molecular axes relax to assume a non-operational twisted state with a twist of $\pi$ radians, for which reason it is termed a 'pi' cell. This device exhibits, in a single cell, a similar optical result as the Kaye system which employs two cells. The cell has improved field-of-view because of the inherent mirror symmetry, and improved speed due to the pattern of hydrodynamic flow which eliminates back-flow and its attendant torques. Like many switches, the 'on' rise time is quite rapid, and can be as short as 100 $\mu$s. The relaxation time of such switch, although the fastest of any nematic switch device yet developed, is nonetheless 10 to 20 times longer at 1–2 ms. Finally, the optical switch action is based on simple retardance, and thus is not achromatic.

Buzak, in U.S. Pat. No. 4,583,825, describes how the field-of-view, which is generally worst at 45 degrees to the director of the LC at the entrance face, may be improved by placing a second cell and polarizer in series with the first, with the second cell rotated axially by 45 degrees. In this way, the contrast is always good for one of the two devices in series, and a high contrast is always obtained, although it appears to introduce a factor of 2 loss in efficiency in coupling between the two stages. It is thus similar to the Heynderickx switch, in that it redistributes the off-axis axial pattern at the cost of significantly lower throughput. This switch construction is of little use in a high-efficiency optical system.

Kalmanash and Fergason teach a multi-color display, in U.S. Pat. No. 4,770,500, which provides red, green, or yellow outputs. The switch comprises two ECB cells with their director orientations opposed in a push-pull configuration. This switch is used as an electro-optic switch capable of introducing plus or minus a quarter-wave. A quarter-wave plate is placed in series with this switch resulting in a retardance of 0 or a half-wave. This is used to select red or green, which have orthogonal polarizations coming from a pleochroic polarizer. The analyzer is a neutral polarizer. The speed of response is said to be improved because of the push-pull ECB device. These are discussed more fully in Fergason's U.S. Pat. Nos. 4,540,243 and 4,436,376. As a switch element, the push-pull configuration offers speed but is not achromatic. Further, the use of two elements in series produces twice as much perpendicularly aligned liquid crystal material as other switches which degrades the field-of-view when both cells are driven.

Use of film compensating layers with a single LC cell to improve the viewing angle for TN cells with a 90° twist angle is taught by Haas in U.S. Pat. No. 5,375,006. Kikuchi et. al., in U.S. Pat. No. 5,440,413, teach the use of two biaxial plates to compensate a 90° TN cell. Kanemoto et. al., in U.S. Pat. No. 5,380,459, teach the use of a polysiloxane polymer layer with a maximum refractive index perpendicular to the substrates of a cell in order to improve the viewing angle. Use of such compensating films is necessary in the construction of STN cells, having twist angles from 210° to 270°, as described by Wada et. al. in U.S. Pat. No. 5,337,174. Akatsuka, in U.S. Pat. No. 5,523,867, teaches the use of a biaxial film to compensate a STN cell. Use of multiple retardation plates arranged on opposite sides of a STN cell is taught by Yoshimizu et. al. in U.S. Pat. No. 5,126,866. Ohnishi and Kishimoto, in U.S. Pat. No. 5,400,158, teach the use of films in conjunction with an optically anisotropic substance with a twisted structure to compensate a STN cell. Optical switches utilizing the ECB effect and including one or more layers adjacent one another between the polarizer and one side of the LC cell are described by Kanemoto et. al. in U.S. Pat. No. 5,175,638, which employs a film with its maximum optical index oriented normal to the cell faces. Bos, in U.S. Pat. No. 5,187,603, discloses a single film used to compensate a pi cell and, in U.S. Pat. No. 5,410,422, teaches the use of a negative birefringence material to compensate a pi cell. These prior art devices use one or more films to compensate a single liquid crystal cell with only moderate improvement in the overall viewing angle.

In summary, the aforementioned optical switches provide high efficiency, a wide viewing angle, or achromatic behavior, but none provide a switch which exhibits all of these properties using a single element. Those switches which use two LC cells do not incorporate means to reduce the effect of field-aligned molecules in the driven state, an effect which is twice as great in such switches. This materially degrades the off-axis performance thereby rendering the switch useless for high-performance applications. Conversely, those switches which use a single LC cell do not achieve achromatic action and a sufficiently wide field-of-view. Thus, no prior art optical polarization switch provides highly efficient, achromatic, angle-independent switch action as is required for field-sequential color filters, high-performance shutters, and similar applications.

SUMMARY OF THE INVENTION

The present invention provides an improved nematic liquid crystal switch for use in a variety of optical systems. An object of the invention is to provide a switch which offers relatively high efficiency and relatively low leakage, together with a very wide viewing angle and achromatic switch action. Another objective is to provide an expanded field-of-view for a wide variety of liquid crystal switches and improved off-axis performance over existing designs without necessarily providing achromatic switch action. Yet another objective is to provide a switch with a response time of less than approximately 0.5 ms when switching between three states serially or with relatively rapid open and close times when used as a simple shutter. Another aspect of this invention is to provide a method for using such a switch in color filters to insure that, if residual color-dependent switch defects are exhibited in one switch state, the filter action transmits only the color of light for which the switch works well so as to achieve peak performance levels.

The inventive optical polarization switch includes two nematic LC cells arranged optically in series with one or more retarding films disposed between the two cells, thereby with a single construction cancelling chromatic defects when the cells are in a relaxed state and correcting for off-axis defects when the cells are in an energized state. The one or more films comprise: (1) a half-wave retarder for a selected wavelength in the operating range; (2) an achromatic half-wave retarder; or (3) a polarization rotator. The two cells may be TN, pi-cell ECB, or surface-mode ECB cells. It is within the intended scope of the invention, and often desirable, to construct the switch using two identically constructed cells. The inventive switch provides improved freedom from chromatic error over a wider field-of-view than that of conventional devices.

Conventional nematic LC switches exhibit driven state off-axis defects resulting from field-aligned liquid crystal molecules. These defects are most evident for light incident in a plane with an azimuth angle which is approximately +/−45° (or +/−135°) relative to the entrance linear polarization E field. The present invention perfectly or substantially compensates for these rays, as well as those whose plane of incidence includes the optical E field or is orthogonal to the optical E field. Only weak, eighth-harmonic polar residual terms remain. No prior method compensates for off-axis defects of the energized state.

The invention preferably includes switches exhibiting three states: (1) a state in which both cells are off; (2) a state in which a single cell is on; and (3) a state in which both cells are on. Provision of three distinct states is beneficial in optical shutter applications and in field-sequential RGB filters.

The transitions from state 1 to 2, and from state 2 to 3, are very fast, as for example 100 /µs, since each transition involves energizing a liquid crystal cell and both transitions are equally rapid. Unlike previous wide field-of-view switches, however, the present invention exhibits not only a relatively rapid rise time but also a relatively rapid fall time.

The transition from state 3 back to state 1 involves both cells going from an energized to a relaxed state, an action referred to as 'resetting' the switch. In this invention, states 1 and 3 exhibit the same optical action, no change to the polarization state of the light, while in state 2 the light is actively transformed from one polarization state to its orthogonal complement.

As states 3 and 1 are both null, the return to relaxed state 1 can be made unobtrusively, by relaxing both cells simultaneously. For cells of matched construction, there is relatively little transient effect, either for on-axis or off-axis rays. In shutter applications this is a critical benefit.

Other switches built according to the invention have two states, each of which is achromatic, has a relatively wide field-of-view, and has essentially no leakage. The invention uses retardation films between the two LC cells to compensate both the field-off and the field-on states of the cells, over a relatively wide range of angles and wavelengths. In this way, the switch is achromatic, extremely efficient, exhibits essentially no leakage, and has a relatively very wide field-of-view.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 2b shows a Poincare sphere representation of the polarization state of incident light as it emerges from the switch in FIG. 2a;

FIG. 3b shows a Poincare sphere representation of the polarization state evolution as light of a nominal design wavelength passes through the switch in FIG. 3a;

FIG. 3c shows a Poincare sphere representation of the polarization state evolution as light of a longer wavelength relative to the nominal design wavelength passes through the switch in FIG. 3a;

FIG. 3d shows a Poincare sphere representation of the polarization state evolution as light of a shorter wavelength relative to the nominal design wavelength passes through the switch in FIG. 3a;

FIG. 4b shows a Poincare sphere representation for normal incidence rays and off-axis rays at 20° incidence through the switch in FIG. 4a;

FIG. 5b shows a Poincare sphere representation for normal incidence rays and off-axis rays at 20° incidence through the switch in FIG. 5a;

DETAILED DESCRIPTION OF THE PREFERRED EMBODIMENTS

In this detailed description of the inventive optical polarization switch certain terms are synonymous in meaning and interchangeably used. The different states of the liquid crystal cells are described in terms of whether or not power is supplied to each of the nematic liquid crystal cells. In so doing the terms "on", "field-on", "driven", and "energized" will be interchangeably used to describe a situation in which power from a power source is supplied to a cell; whereas the terms "off", "field-off", "undriven", and "unenergized" are interchangeably used to described the state in which power is not supplied to the cell.

Figure 1A:
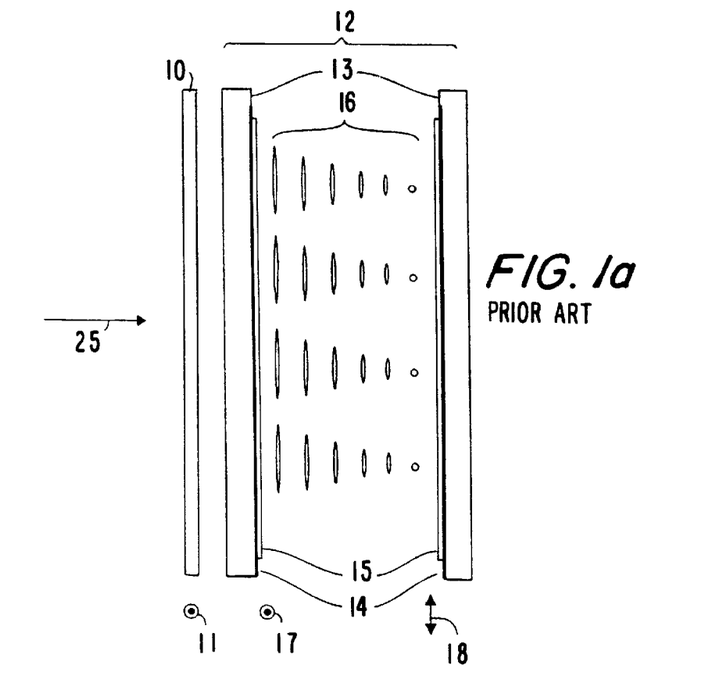
FIG. 1a shows a prior art switch including a linear polarizer and a single TN LC cell in a field-off unenergized state with the light normally incident.

FIG. 1a shows a prior art transmissive switch including a linear polarizer 10, with transmission axis 11 oriented at an angle of 0°, in series with a TN cell 12, constructed of substrates 13 whose inner surfaces have been treated with indium tin oxide (ITO) or other material to provide transparent electrodes 14 and further processed to provide selective alignment means 15, which orient the nematic liquid crystal unique axis 16 in a helical structure with a twist angle of 90° between the two faces. The crystal axis 17 at the entrance face is oriented at 90° and the crystal axis 18 at the exit face has an orientation of 180°. Because the liquid crystal material has a positive uniaxial anisotropy the fast axis is perpendicular to the liquid crystal axis. Thus, the fast axis at the entrance face of the cell is at 0° and twists to 90° at the exit face of the cell. The thickness of the cell, d, and the liquid crystal birefringence δn are selected in accordance with the Gooch-Tarry equation $$T = \frac{\sin^2(\pi/2(1+u^2)^{1/2})}{1+u^2}$$

where u=2dδn /λ, and for which minimum transmission is obtained when $$(1+u^2)^{1/2}=2k$$

where k is an integer.

The cell is constructed so that k=1, or a so-called first-minimum, for light in the middle of the wavelength range of interest.

A Poincare sphere is often used to represent the polarization states of light. This 1 method is explained in many books, such as *Principles of Optics*, by Born and Wolf (Pergamon Press, Oxford, 1980), herein incorporated by reference. The orientation of the sphere is indicated by orthogonal axes, polar circles at 0 and 90 degrees of longitude, and latitudes at +/−60 degrees as well as the equator at zero degrees. Unpolarized light incident on element 10 is linearly polarized in the state 23 represented by the location with (longitude, latitude) of (0,0) on the Poincare sphere of FIG. 1b. The light is transformed along curve 24 in passing through the TN crystal structure to a new polarization which depends on the wavelength. The polarization state may be measured empirically or calculated. One method for determining the polarization state is to consider the liquid crystal with its helically oriented axes to be composed of many thin slabs, each of which is a waveplate, and to use Jones matrices to calculate the effect of the overall system. Yariv and Yeh, in *Optical Waves in Crystals*, Wiley-Interscience, NY (1984), herein incorporated by reference, describe this method along with the use of the Jones calculus which includes a treatment of a twisted uniaxial crystal. The output polarization is then plotted on the Poincare sphere for each wavelength of interest.

Figure 1B:
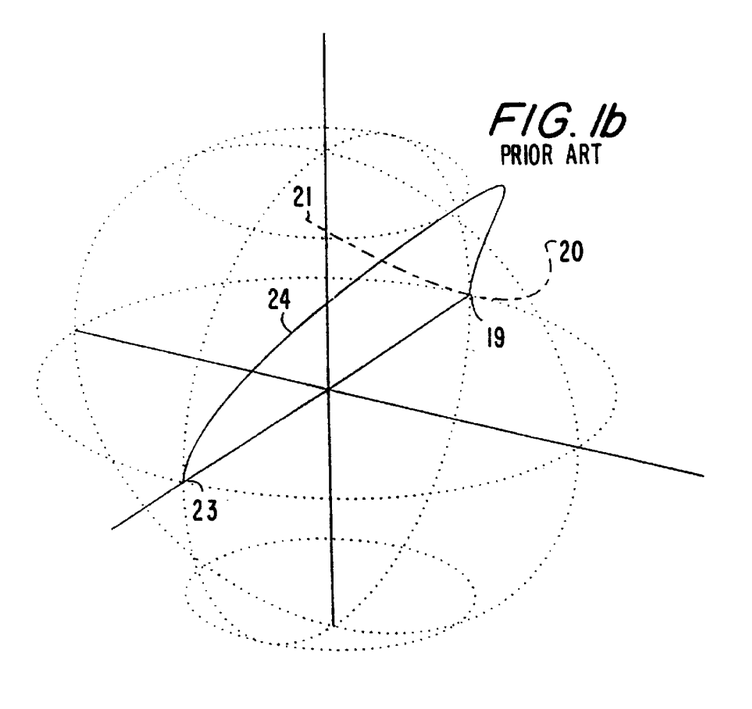
FIG. 1b shows a Poincare sphere representation of the polarization state evolution as light of a nominal wavelength traverses the TN cell switch in FIG. 1a and the locus of the output state as the input wavelengths deviate from the nominal design wavelength.

The light emerging from the exit face has a polarization state 19 which inscribes an arc through the point (180,0) at the wavelength for which the Gooch-Tarry criterion is met. Ends 20 and 21 of the arc correspond to the shortest and longest wavelengths, respectively, for which the light has significant polarization ellipticity as indicated by the latitude rising above 0°.

Figure 2A:
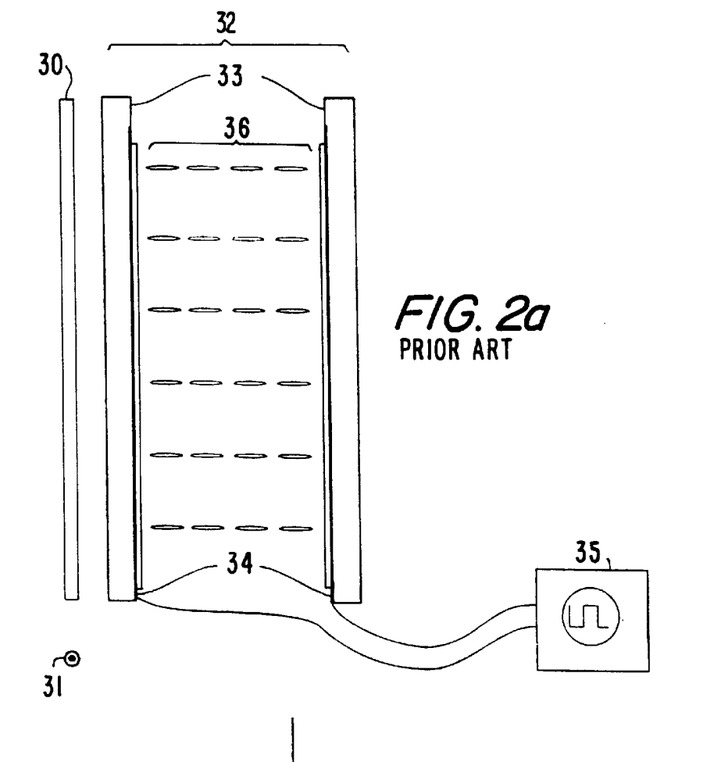
FIG. 2a shows the TN cell switch of FIG. 1a in a field-on energized state.

FIG. 2a shows the prior art system of FIG. 1 in the energized state. A polarizer member 30 with polarization axis 31 at 0° is followed by the liquid crystal cell 32. A voltage is applied across electrodes 34 of the substrates 33 by voltage source 35. This source provides a voltage significantly greater than the threshold voltage for the cell. The liquid crystal material 36 is selected to have positive dielectric anisotropy δε. Substantially all of the liquid crystal molecules along the optical axis are aligned parallel to the electric field because of the field-dipole interaction between the liquid crystal molecules and the strong applied field.

Figure 2B:
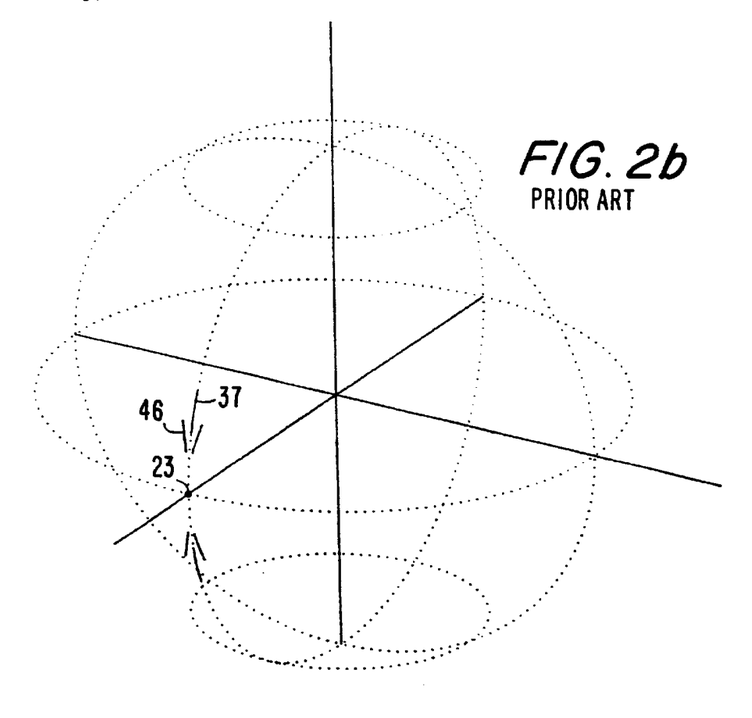

On the corresponding Poincare sphere in FIG. 2b the polarization state 23 at the entrance polarizer 30 is (0,0), and is unchanged for on-axis rays since they are along the optical axis of the substantially all field-aligned uniaxial positive liquid crystal. Off-axis rays experience optical anisotropy with a slow axis in the plane of incidence as defined by the azimuth direction of the obliquely incident rays. The amount of birefringence may be calculated using standard methods for uniaxial crystals such as those disclosed by Born and Wolf. From these calculations the polarization state can be drawn for off-axis rays of light exiting the switch.

Rays with azimuth angles of 0°, 90°, 180°, or 270° are unaffected by the field-on energized liquid crystal material. The birefringence is in the plane of incidence, which for these rays is either parallel to or perpendicular to the polarizer transmission axis. As a result, only one eigenstate is transmitted through the slab and the light emerges from the cell 32 with unchanged linear polarization 23 at location (0,0) on the Poincare sphere. Rays with azimuth angles of 45°, 135°, 215°, and 315° are most transformed. For these, equal amounts of both eigenstates are transmitted, and the polarization change is greatest, as shown in FIG. 2b as curve 37 as a function of wavelength. For these rays the switch has the most leakage in the energized state. At intermediate azimuths such as 22.5° the polarization falls along curves such as 46 with the ends closest to (0,0) corresponding to longer wavelengths for which the retardance, in waves, is smallest.

Figure 3A:
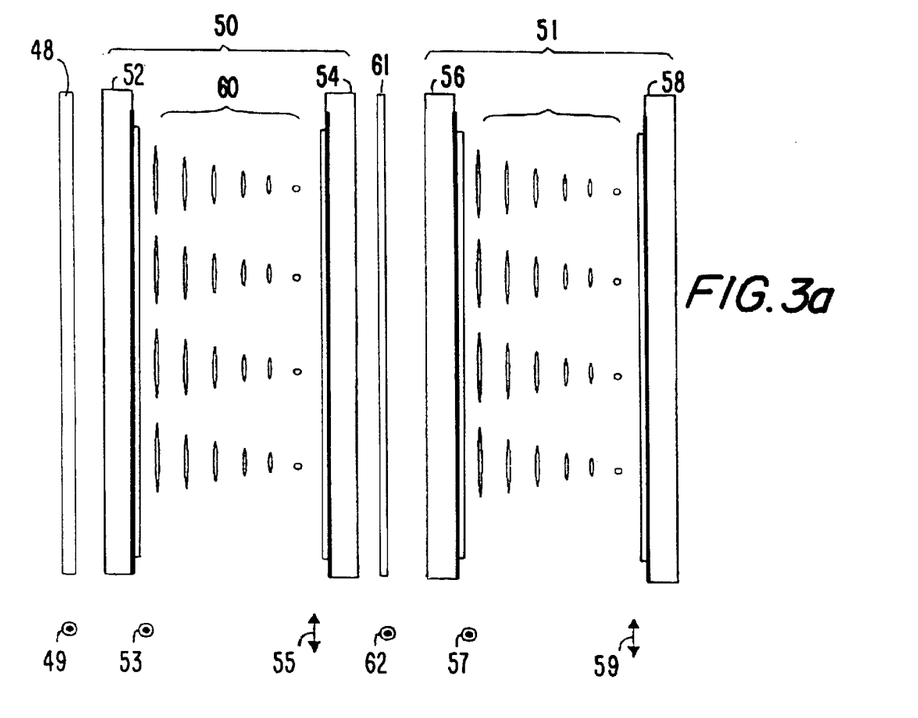
FIG. 3a shows a first embodiment of a switch constructed according to the present invention comprising a pair of TN cells, both in a field-off unenergized state, and a half-wave retarder arranged between the two cells.

FIG. 3a shows a first embodiment of the switch according to the present invention comprising a linear polarizer 48 with transmission axis 49 oriented at 0° and two TN cells 50 and 51. An entrance face 52 of cell 50 is treated to provide a liquid crystal alignment with the crystal fast axis 53 at 0° and an exit face 54 is treated to provide a liquid crystal alignment with the crystal fast axis 55 at 90°. Entrance face 56 of cell 51 is treated to provide a liquid crystal alignment with the crystal fast axis 57 at 0° and exit face 58 is treated to provide a liquid crystal alignment with the crystal fast axis 59 at 90°. Thus, both cells have the same sense of twist and a total helix angle of 90°. The method of orienting the liquid crystal material produces a pre-tilt angle whereby the molecules of the liquid crystal fluid 60 are slightly inclined to the planes defined by the substrate faces. Disposed between cells 50, 51 is a half-wave retarder 61 such as a retarder film, a half-wave plate, or an achromatic half-wave plate (AHWP), as for example described by Title, A. M. and Rosenberg, W. J., "Achromatic Retardation Plates", Proc. SPIE 307, 120–125 (1981), herein incorporated by reference, with a fast axis 62 oriented at 0°.

Figure 3B:
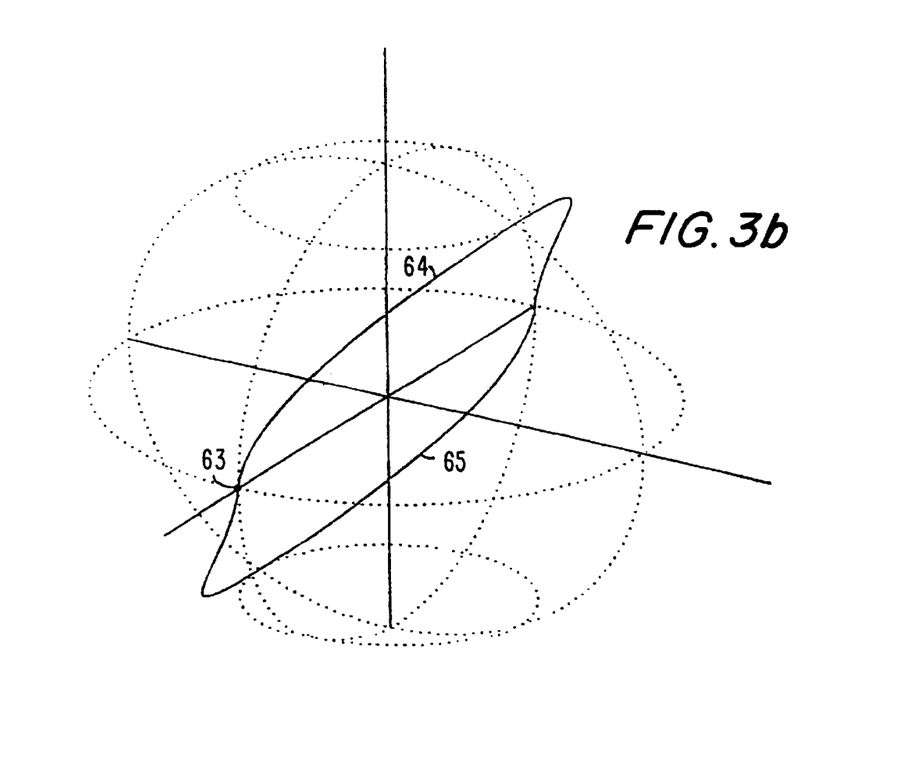
Figure 3C:
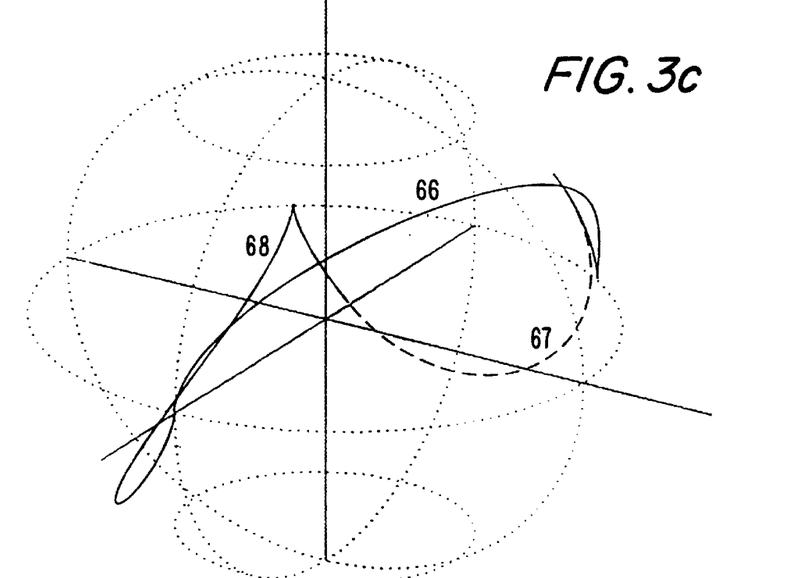
Figure 3D:
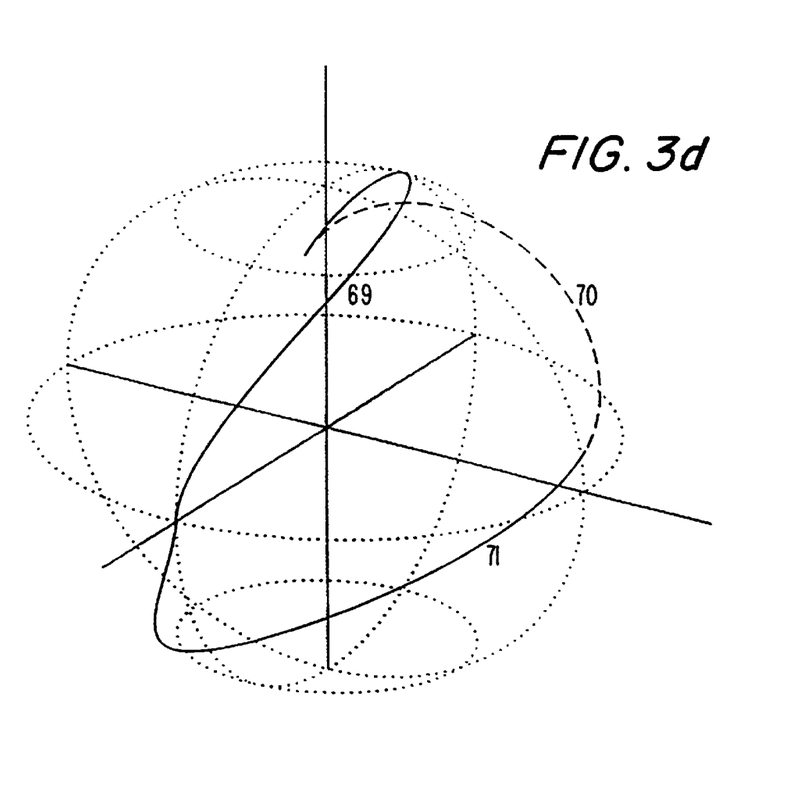

On the Poincare sphere in FIG. 3b light from the polarizer 48 enters the first cell 50 at location 63 and its polarization state is transformed along curves 64 and 65 upon passing through cells 50 and 51, respectively, while at the nominal design wavelength of the cells. Light of a longer wavelength than the nominal design wavelength is shown in FIG. 3c and is transformed along curves 66, 67 and 68, while light of a shorter wavelength than the nominal design wavelength is shown in FIG. 3d as it is transformed along curves 69, 70 and 71. Paths 67 and 70 result from the effects of the half-wave retarder 61. In each case the exit or output polarization is essentially that of the entrance or input polarization at 63. The transformations may be calculated using the Jones matrix approach and may be intuitively visualized on a Poincare sphere.

A geometric construction applicable to simple retarders will now be described. In general, a retarder transforms the polarization state along an arc on the Poincare sphere comprising a portion of a circle centered on the point corresponding to the eigen-polarization state of the fast axis of the retarder and including the point which represents the polarization state of light when it encounters the retarder. The clockwise angular extent of the arc is proportional to the retardance in waves such as 180° for a retardance of $\lambda/2$. For an AHWP the arc is always 180°. In geometric terms, the effect of a retarder is easily visualized by picturing a protractor with its pivoting leg placed at the location corresponding to the retarder's fast axis and the non-pivoting leg placed at the location of the input polarization. Then, the non-pivoting leg of the protractor is swung in a clockwise direction through an arc of $360*R/\lambda$ degrees, where R is the retardance of the element and $\lambda$ is the wavelength of the light. The new location corresponds to the exit polarization state.

As shown in FIGS. 3c and 3d for optical wavelengths shorter and longer, respectively, than the nominal design wavelength, half-wave retarder 61 provides an additional path segment 67, 70 which causes the deviation due to wavelength change in cell 50 to be compensated by that in cell 51. Upon exiting the second cell 51 the polarization states at the ends of paths 68 and 71 substantially or perfectly match that at the end of path 65 for the nominal wavelength and represent a relatively slight alteration to the input polarization.

Figure 4A:
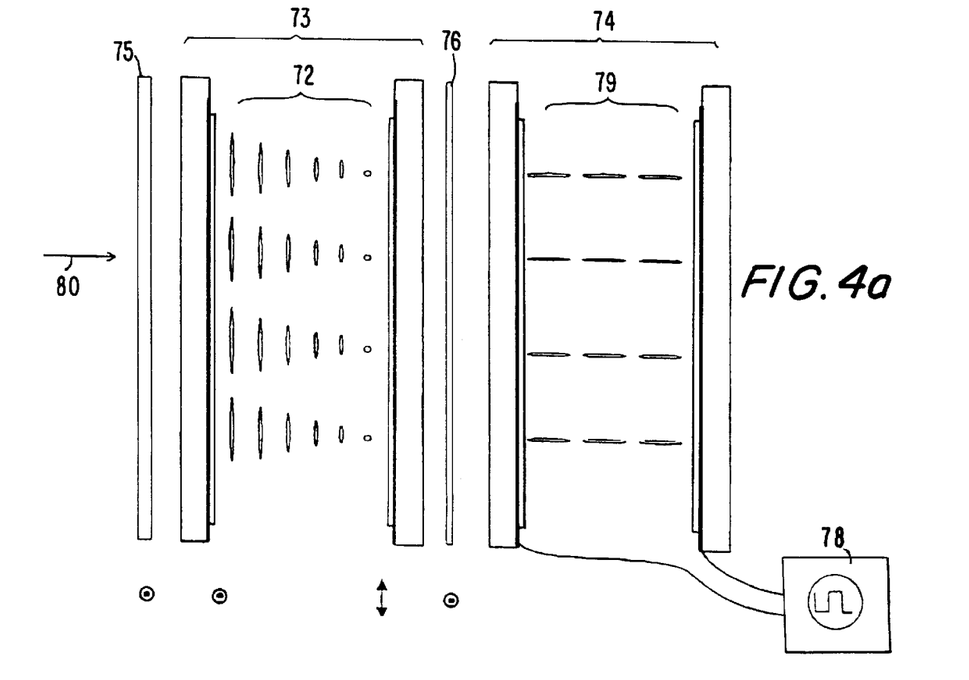
FIG. 4a shows the switch in accordance with the first embodiment with one cell energized.
Figure 4B:
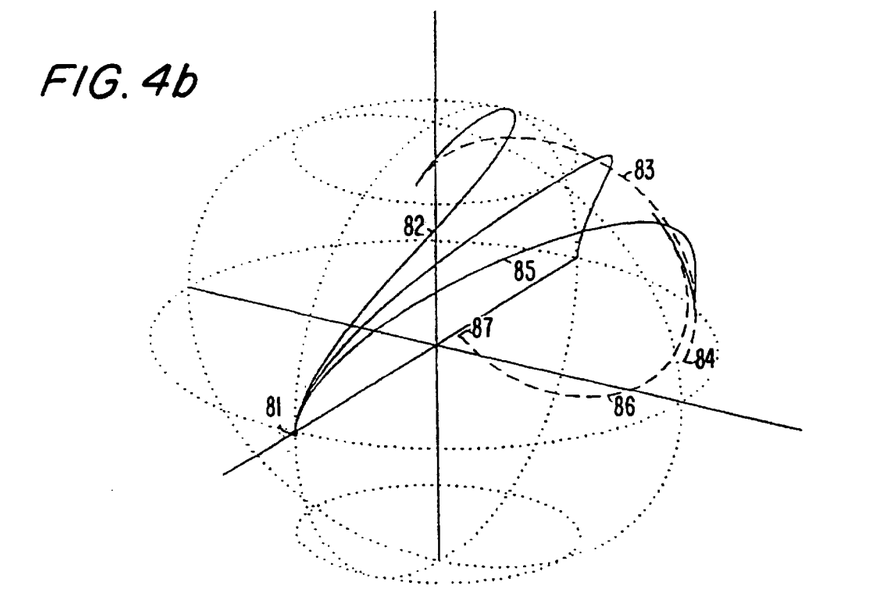

FIG. 4a shows the switching device in FIG. 3a with the second cell energized by voltage source 78 causing the molecules 79 to be aligned substantially parallel to the optical axis 80. The optical effect is shown in FIG. 4b on the Poincare sphere. Light enters at point 81 at (0,0) and is transformed by the first cell 73 to a point on locus 82 with the exact point depending on wavelength. The half-wave retarder 76 transforms the light as described above, along an arc such as 83, to a point such as 84. Since the second cell 74 is energized, it has essentially no effect for on-axis rays, and the light leaves the switch with polarization given by 84. Transformations of other wavelengths 85, 86 and 87 are also illustrated.

Figure 5A:
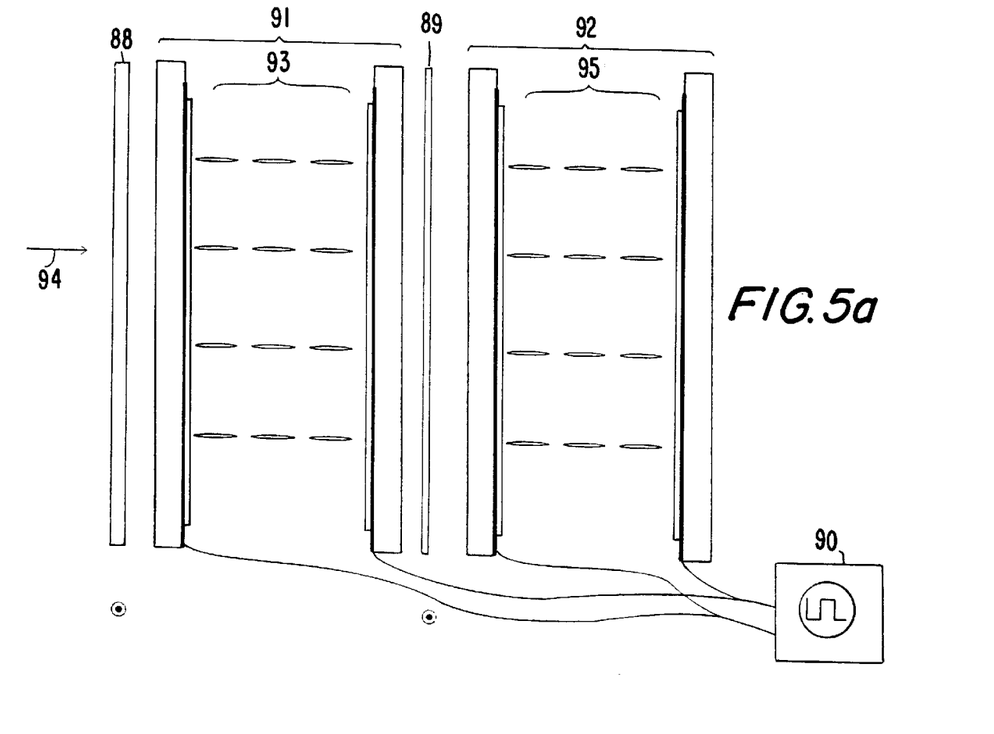
FIG. 5a shows the switch in accordance with the first embodiment with both cells energized.
Figure 5B:
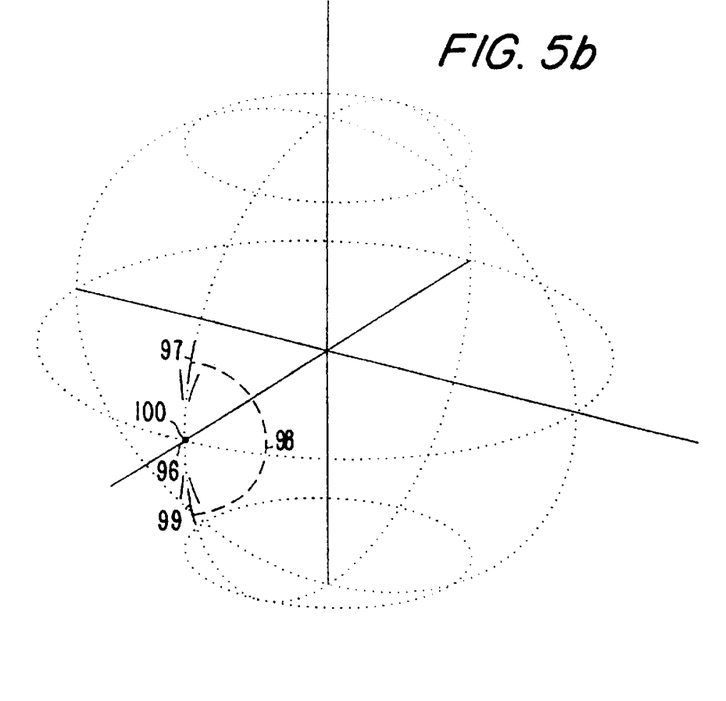

FIG. 5a shows the situation in which both cells of the switch of FIG. 3a are energized. Voltage source 90 is connected to cells 91 and 92 and all of the liquid crystal molecules 93 are aligned substantially parallel to the optical axis 94. The polarization states for on- and off-axis rays are shown in FIG. 5b. Light enters at point 96 at the point (0,0). The first cell 91 is energized and thus has essentially no effect for on-axis rays.

On-axis rays exit element 91 still at point 96 or linearly polarized along 0°. Film retarder 89 has the same crystal axis orientation 0° and, thus it too has no effect on the polarization. The second cell 92 is in an energized state and, thus does not alter the polarization which is (0,0) for exiting light rays. There is accordingly an achromatic response with no leakage.

The action for off-axis rays is subtle. Rays enter with polarization of (0,0) and in passing through the first cell 91 are transformed to points along curve 97, the exact point on which depends on the azimuth angle. Curve 97 is determined by noting that, when a relatively large voltage is applied, the liquid crystal molecules 93 behave as a uniaxial crystal with its crystal axis along the optical axis 94. Thus, for a given off-axis ray, the liquid crystal molecules 93 appear as a low-value retarder with a slow axis in the plane of incidence and a retardance value that may be calculated using well established methods for uniaxial crystals. The polarization state of light after passing through cell 91 may be calculated or plotted on the Poincare sphere using the protractor method described above. The size of curve 97 directly depends on the cell thickness and liquid crystal type; that is, the thicker the cells or higher $\delta n$, the larger the magnitude of the curve.

As the light passes through the half-wave retarder 89, its polarization is rotated by an arc of approximately 180° such as curve 98 to a point on curve 99. The second cell 92 transforms the polarization to a point 100 essentially at (0,0). That is, the light is linearly polarized at 0° orientation. The off-axis rays are, therefore, not appreciably degraded. This is one benefit of the invention, in that two cells are used, sandwiched about a half-wave retarder, so as to substantially cancel one another's off-axis leakage in the driven or energized state.

To understand the mechanism involved, it is helpful to consider a ray at 45° azimuth angle. For simplicity, suppose that the half-wave retarder 89 exhibits exactly $\lambda/2$ retardance. In passing through the first cell 91, the ray with a slow axis also at 45° will exhibit a certain amount of retardance. Half-wave retarder 89 reflects the polarization state about its axis at 0° and converts this to an apparent retardance at −45° which is then cancelled by the second cell 92, which exhibits an equal retardance at 45°. As a result, the off-axis retardance of one cell cancels that of the other.

In a preferred embodiment of the switch in accordance with the first embodiment of the present invention, the TN cells may be constructed using a glass substrate such as Corning 7059, with a thickness of approximately 1.1 mm, coated with a transparent ITO electrode having a resistivity of approximately 200 $\Omega$/sq. A nematic liquid crystal layer of type ZLI-2222 is used with a thickness of approximately 3.8 microns. The inner surfaces of the cells are aligned with a spin-coated polyimide which is buffed to achieve a preferred alignment according to well established methods known in the art. The half-wave retarder 89 is an AHWP constructed according to the designs described in Title, using commercially available films manufactured by Polaroid in Cambridge, Mass., or purchased from Meadowlark Optics in Longmont, Colo.

Thus, this preferred construction of the switch in accordance with the first embodiment exhibits three states: (1) a first state in which both cells are relaxed and the light emerges unaltered in polarization state; (2) a second state in which one cell is driven whereby the polarization state is rotated by 90°; and (3) a third state in which both cells are driven and the light emerges unaltered in polarization state. The switch has extremely good achromaticity and off-axis performance in the first and third states when both cells are off and on, respectively. Leakage in either the first or third state is approximately 1% or less over a 40° field-of-view. In the second state when only one cell is driven the performance is essentially that of a simple first-minimum switch, which in this preferred embodiment is optimized to operate at approximately 530 nm. Efficiency is approximately 100% at 530 nm and decreases to approximately 88% at the ends of the visible spectrum.

In some applications this preferred embodiment may be modified so as to reduce the cost of manufacture with relatively little degradation in performance by using a non-achromatic half-wave plate ("simple half-wave plate") instead of an AHWP. It is advantageous to use a simple half-wave plate when the liquid crystal cells are optimized to produce a first minimum near one end of the spectrum rather than in the middle region. The cells in this alternative embodiment are identical in construction to those in the preferred embodiment except that the liquid crystal fluid used is ZLI-1132. This yields a cell with first-minimum behavior at approximately 620 nm. The simple half-wave plate made of NRZ-240 film and manufactured by Nitto Denko America in San Jose, Calif., exhibits a retardance at approximately 240 nm over a relatively wide viewing angle but is not achromatic. At approximately 480 nm, the simple half-wave plate exhibits substantially complete or perfect $\lambda/2$ retardance but at longer wavelengths exhibits less than $\lambda/2$ retardance. As a result, the simple half-wave plate substantially, if not perfectly, compensates in the blue region at approximately 480 nm, but compensates only weakly in the red region. This, however, does not significantly degrade performance since the cells are essentially perfect at approximately 620 nm and provide excellent performance over most of the red wavelength range. Thus, there is little or no chromatic error to be corrected and any deterioration in performance as a result of the imperfect compensation by the simple half-wave plate is negligible because in the on state, the off-axis effects are strongest in the blue region where the simple half-wave plate provides substantially complete retardance at approximately 480 nm. Leakage of approximately 1–2% can be obtained using this construction over the fall visible range for both the off and on states.

Figure 6A:
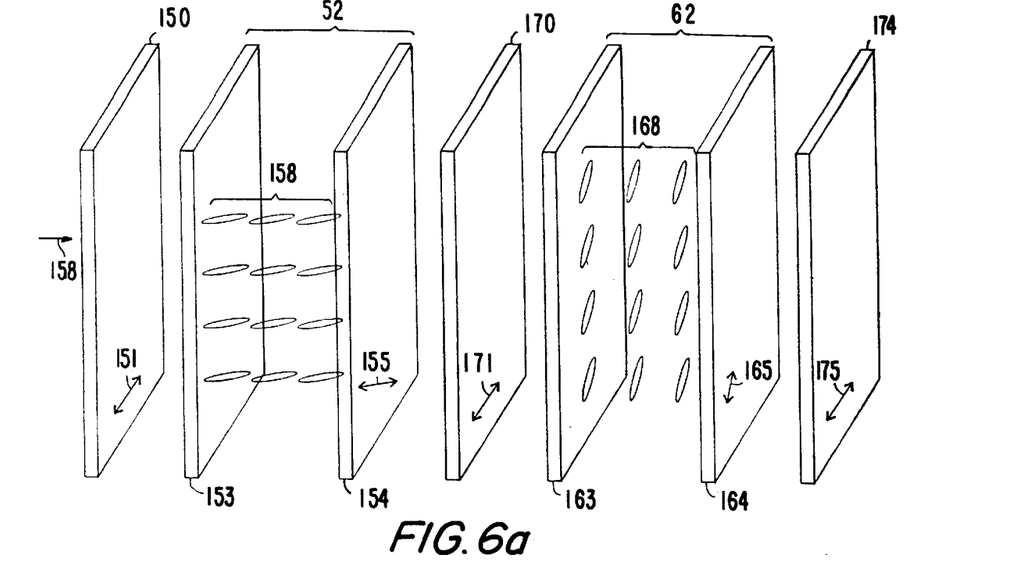
FIG. 6a shows a second embodiment of a switch according to the present invention based on the rotator described by Koester.

FIG. 6a shows a second embodiment of the switch according to the present invention. A first ECB cell 152 comprises two substrates 153 and 154 which have been treated to create an alignment axis 155 for a nematic liquid crystal material 158 which is free of twist within the cell. Similarly, a second ECB cell 162 comprises substrates 163 and 164 which have been treated to create an alignment axis 165 for a nematic liquid crystal material 168 which is free of twist within the cell. Cells 152 and 162 each act as retarder elements. Between cells 152 and 162 is a compensating member 170 such as an optical rotator or an optical half-wave retarder comprising one or more retarding film layers and having an effective fast axis 171. For illustrative purposes only, in FIG. 6a, the compensating member is shown as an AHWP. Light passes serially through an input or entrance polarizer 150 with a transmission axis 151, first cell 152, AHWP 170, second cell 162, and an output or exit polarizer 174 with a transmission axis 175.

Cells 152 and 162 are constructed with a retardance of $\lambda/2$ for light in the middle range of wavelengths which are to be switched. For purposes of illustration only, the switch in accordance with the second embodiment is shown in FIG. 6a with the transmission axis 151 of entrance polarizer 150 oriented at 0°, the crystal axis 155 of cell 152 oriented at an angle of 23.5°, and the crystal axis 165 of cell 162 oriented at an angle of 113.5°. It is, however, within the intended scope of the invention to construct the Koester rotator by selecting any desired cell orientation while adhering to the principles as set forth disclosed by Charles J. Koester, "Achromatic Combinations of Half-Wave Plates", J. Optical Society of America, Vol. 49, No. 4, 405–409 (April 1959), herein incorporated by reference, and taking into consideration the transformation in polarization states realized by the addition of the compensating member disposed between the two cells.

AHWP 170 comprises three component plates, each with a retardance of $\lambda/2$ for light in the middle of its wavelength range. These three successive component plates are oriented with their fast axes at −29°, +29°, and −29°, respectively. The exit polarizer 174 has its transmission axis 175 at 0°.

Light is plane polarized at 0° by entrance polarizer 150, and in passing through first cell 152 is transformed to an approximately plane polarization at +45°. AHWP 170 further transforms the light exiting from the first cell 152 to an approximately plane polarization at −45°, and then the second cell 162 transforms the light to a plane polarization at 90°. Together the first and second cells 152, 162 provide an achromatic action, as the imperfect transformation for wavelengths at the extremes for which these cells are not exactly $\lambda/2$ plates are arranged so as to cancel out. Since AHWP 170 is also achromatic in its action the overall system is highly achromatic.

Figure 6B:
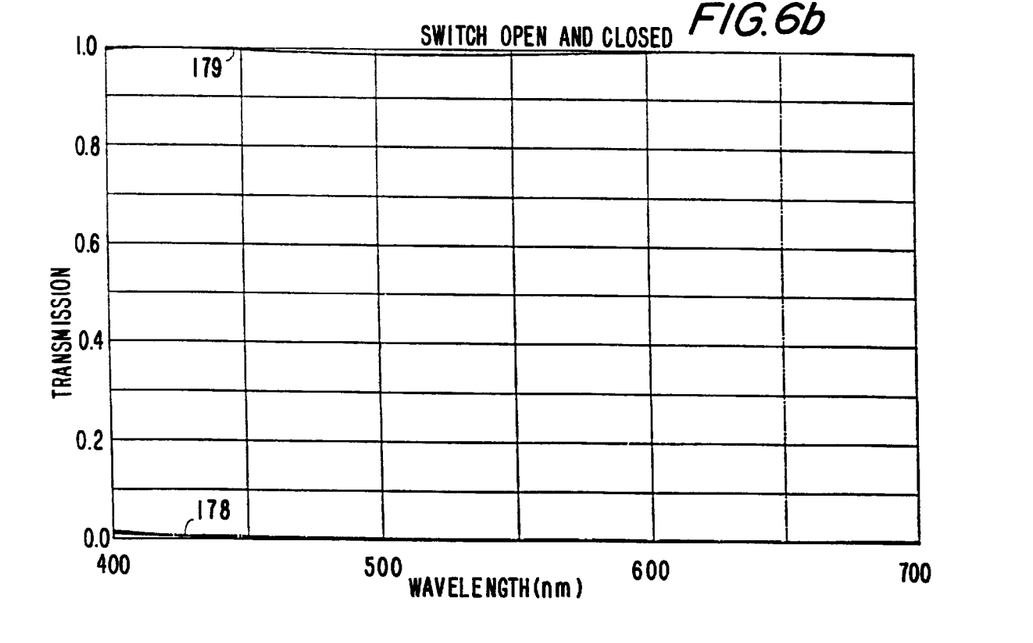
FIG. 6b shows the transmission vs. wavelength curve of the switch in FIG. 6a, when placed between linear polarizers, for both the field-off and field-on states.

The graph in FIG. 6b represents the transmission for light as much as 20 degrees off-axis and at all azimuths of incidence. Curve 178 shows the transmissions in the field-off undriven state, while curve 179 shows the transmission for the field-on driven state. Leakage for both states is only approximately 1% at all wavelengths in the visible region. In the driven state, the switch behaves exactly like the switch in the first embodiment in the driven state. The light polarization deviates from point 23 as in FIG. 2b; after passing through cell 152 but after transformation by AHWP 170 this deviation is compensated by cell 162, so that light emerges from the exit polarizer 174 with essentially unchanged polarization for both on-and off-axis rays. Relatively high transmission is achieved, as represented by curve 179, and approximately 99% of the light is transmitted by the exit polarizer 174.

In a preferred embodiment of the switch in accordance with the second embodiment of the present invention the switch comprises two pi cells, each of which is a $\lambda/2$ waveplate in the partially relaxed state. The first cell 152 is oriented with its liquid crystal alignment slow axis at 23.5° and the second cell 162 is oriented with its liquid crystal alignment slow axis at 113.5°. Interposed between the two cells 152, 162 is an AHWP 170 with its effective fast axis at 0°. The result is a Koester rotator, which has been modified by the addition of the AHWP 170 and the alteration of the crystal axis 165 of the second cell 162, accordingly. In this state, the switch acts as an achromatic 90° rotator. Linearly polarized light entering the assembly at 0° emerges at 90°. When the pi cells are driven, the assembly acts as an AHWP with its axis at 0° and linearly polarized light entering the assembly at 0° exits unaltered. With output polarizer 174 oriented with its transmission axis 175 at 0° the switch blocks light in the field-off undriven state and transmits light in the field-on driven state.

Alternatively, this preferred construction of the second embodiment may be modified using flat-field liquid crystal cells instead of pi cells so as to avoid the problems of the pi cells relaxing from the partially relaxed state which otherwise occurs in a few tens of milliseconds. The flat-field liquid crystal cells can be constructed using conventional techniques. In this alternative embodiment the half-wavelength flat-field liquid crystal cells are preferably made using Corning 7059 glass, coated with ITO, as manufactured by Donnely Applied Films Corp, to yield a resistivity of approximately 200 $\Omega$/sq with a buffed polyimide alignment layer and a $4\mu$, film of ZLI-1800. The AHWP may be purchased from Meadowlark Optics or made by laminating three layers of NRF-270 film with the slow axes oriented at −29°, +29°, and −29°, accordingly.

It is also within the intended scope of the invention to modify the second embodiment and employ two liquid crystal cells, both cells either pi cells or flat-field cells, each with a nominal retardance of λ/2. The first cell is oriented with its slow axis at 23° and the second cell is oriented with its slow axis at −23°. Interposed between the two cells is a 90° fixed Koester rotator made of polymer films. The fixed Koester rotator is preferably manufactured using two layers of NRZ-270 with the slow axes at 67° and 113°, respectively. Thus, the overall assembly is itself a Koester rotator modified by the addition of the fixed Koester rotator disposed between the two cells and the corresponding change in orientation of the second liquid crystal cell. When the liquid crystal cells exhibit λ/2 retardance, the overall assembly is a null element. The 90° rotation introduced by the cells is further rotated by the internal 90° fixed Koester rotator and, as a result, the linearly polarized light entering the assembly at 0° exits the assembly unaltered. This action is achromatic with negligible leakage and a relatively wide field-of-view. When the liquid crystal cells are driven to a low-retardance state the only action is that of the fixed Koester rotator and linearly polarized light exits the assembly rotated by 90°. Off-axis retardance experienced in the energized state is compensated by the fixed Koester rotator, in that the waveplate action introduced by the first liquid crystal cell is rotated by the fixed Koester rotator, and then substantially cancelled by the waveplate action introduced in the second cell.

Figure 7A:
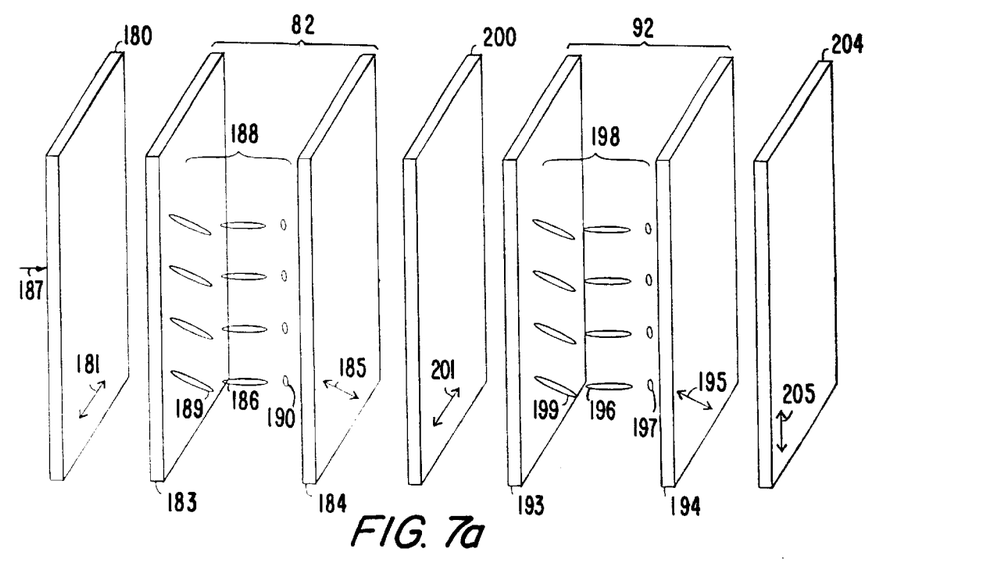
FIG. 7a shows a third embodiment of a switch according to the present invention including two pi-type ECB cells, with their axes oriented at 45°, separated by an achromatic half-wave rotator with its fast axis oriented at 0°.
Figure 7B:
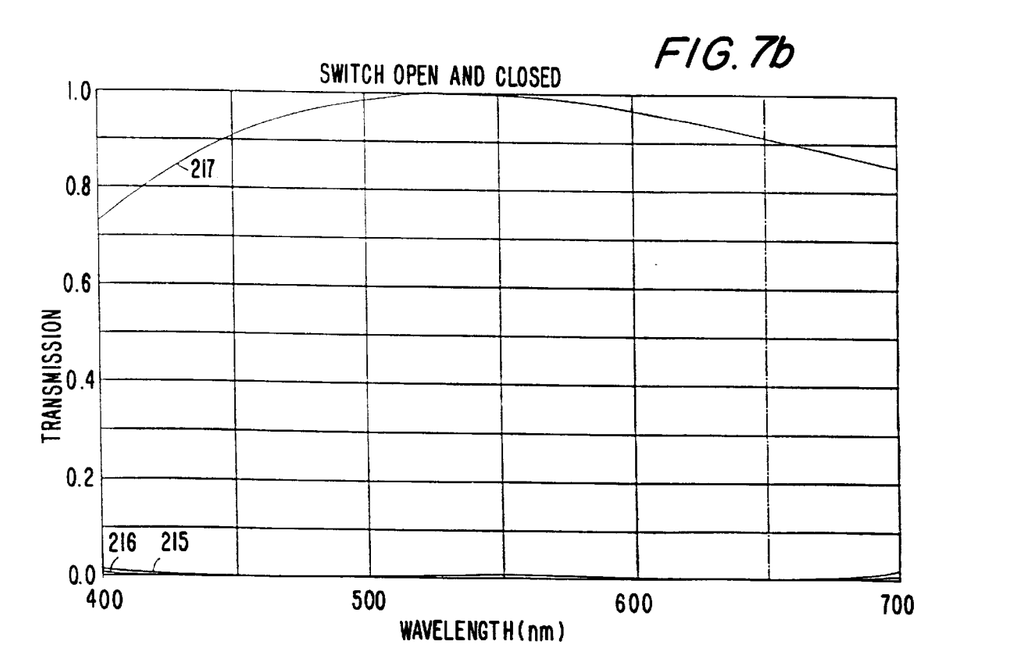
FIG. 7b shows the transmission of the switch in FIG. 7a, when placed between crossed polarizers, in three configurations: (1) with both cells energized; (2) with one cell energized; and (3) with both cells exhibiting a half-wave of retardance.

A third embodiment of the switch according to the present invention is shown in FIG. 7a. The switch includes a first cell 182 comprising two substrates 183 and 184, the inner surfaces of which are treated to align the liquid crystal material 188 with a selected crystal axis 185. The treatment and orientation of the two substrates are such that the tilt angle between the liquid crystal molecules and the substrates are opposite at the two faces, in the so-called splay configuration, when no voltage is applied. In the metastable state shown in FIG. 7a the central molecules 186 are oriented along the optical axis 187 while those molecules closer to the substrates such as 189 are oriented more nearly parallel to the substrate. A second cell 192 is similarly constructed with its crystal axis 195 parallel to that of the first cell 182. Interposed between cells 182 and 192 is an AHWP 200 with an effective fast axis 201. The switch in accordance with the third embodiment also includes an entrance polarizer 180 with its transmission axis 181 and an exit polarizer 204 with a transmission axis 205. Both cell axes 185 and 195 are oriented at +45°, while the axis 181 of the entrance polarizer and the effective fast axis 201 of AHWP 200 are oriented at 0°. The exit polarizer transmission axis 205 is oriented at 90°. Light entering the first cell 182 experiences a retardance with crystal axis at 45°. After passing through the first cell 182, the light is reflected about 0° by the AHWP to an apparent axis at −45° and then combined with the retardance of the second cell 192 with its crystal axis at 45°. The components 182, 200 and 192, appear as a single retarder at 45°, with a retardance given by the difference between the retardance of the first cell 182 and that of the second cell 192. If the retardances of the first and second cells are equal the light will be unaltered. The transmission is shown in FIG. 7b with both cells undriven, as curve 215; with both cells driven, as curve 216; and, with only cell 182 driven, as curve 217.

This third embodiment is similar to the push-pull arrangement taught by Kalmanash, except that instead of orienting the two cells with their crystal axes orthogonal to one another, the cells are oriented so that their crystal axes are substantially parallel to one another. In the present invention, the push-pull action is provided by the AHWP 200 which causes the retardances of the cells to oppose one another, thereby improving the field-of-view. In general, the off-axis compensation depends on the extent to which the second cell matches the optical performance of the first cell since the two cells are identically constructed and off-axis rays experience the same optical action in each cell, except for differences in drive voltage and the inevitable differences between two like parts during manufacture. The compensation is introduced by the AHWP which causes the optical effect of the first cell to be subtracted from the optical effect of the second cell and thus substantially cancel each other out. This is distinguishable from the Kalmanash device in which compensation is achieved by orienting the cells with their axes rotated 90° relative to one another. In the Kalmanash device off-axis rays do not experience the same optical action in passing through each cell because the cells are not rotationally invariant.

In a preferred embodiment this third embodiment is constructed using two pi cells, each having a fast axis oriented at 0°, and an AHWP disposed between the two cells. The AHWP is preferably constructed from three layers of biaxial film NRZ-270, manufactured by Nitto Denko America in San Jose, Calif., with slow axes oriented at −30°, +300, and −30°, respectively, in series. When equal voltages are applied to each of the cells no optical action is produced by the overall system. When a larger voltage is applied to the first cell relative to the second cell the system exhibits a net positive retardance at 45°; conversely, when a larger voltage is applied to the second cell relative to the first cell a negative retardance is exhibited. All voltages are AC square waves of approximately 3 kHz. Conventional techniques for manufacturing and driving pi cells may be employed to obtain the rapid response inherent in these devices.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. An optical polarization switch acting upon incident light having a polarization state along a polarization axis, comprising a first nematic liquid crystal cell which selectively alters polarization of light passing therethrough depending upon an application of external energy to said first nematic liquid crystal cell, but which does not substantially displace the path of the light;

a second nematic liquid crystal cell which selectively alters polarization of light passing therethrough depending upon an application of external energy to said second nematic liquid crystal cell but which does not substantially displace the path of the light, said second nematic liquid crystal cell being arranged in optical series with said first nematic liquid crystal cell;

a compensation means interposed between said first and second nematic liquid crystal cells, wherein said compensation means comprises one of an optical rotator effecting substantially 90° rotation of the polarization state of light exiting the first nematic liquid crystal cell, an optical half-wave retarder having a slow axis oriented substantially parallel to the polarization axis of the incident light, and an optical half-wave retarder having a fast axis oriented substantially parallel to the polarization axis of the incident light.

2. The optical polarization switch in accordance with claim 1, wherein said compensation means comprises a retarder.

3. The optical polarization switch in accordance with claim 1, wherein said compensation meads comprises a half-wave which is achromatic over a predetermined range of wavelengths.

4. The optical polarization switch in accordance with claim 1, wherein said compensation means comprises a half-wave retarder having a fast axis oriented substantially parallel to the polarization axis of the incident light.

5. The optical polarization switch in accordance with claim 1, wherein said compensation means comprises a half-wave retarder having a slow axis oriented substantially parallel to the polarization axis of the incident light.

6. The optical polarization switch in accordance with claim 1, wherein said compensation means comprises an optical rotator effecting substantially 90° rotation of the polarization state of light exiting the first nematic liquid crystal cell.

7. The optical polarization switch in accordance with claim 1, wherein said first and second nematic liquid crystal cells comprise twisted nematic cells.

8. The optical polarization switch in accordance with claim 7, wherein said twisted nematic cells have an identical twist angle and twist sense.

9. The optical polarization switch in accordance with claim 8, wherein the twist angle of each of said twisted nematic cells is approximately 90 degrees.

10. The optical polarization switch in accordance with claim 1, wherein said first and second liquid crystal cells comprise electrically controllable birefringence cells.

11. The optical polarization switch in accordance with claim 10, wherein said first and second nematic liquid crystal cells comprise pi cells.

12. The optical polarization switch in accordance with claim 10, wherein said first and second nematic liquid crystal cells each have an optical fast axis oriented substantially parallel to one another.

13. The optical polarization switch in accordance with claim 10, wherein said first and second nematic liquid crystal cells each have an optical fast axis oriented at a predetermined angle relative to one another, and wherein together said first and second nematic liquid crystal cells comprise a switchable achromatic rotator for light within a predetermined wavelength range.

14. The optical polarization switch in accordance with claim 13, wherein said compensation means comprises a half-wave retarder having a fast axis oriented substantially parallel to the polarization axis of the incident light.

15. The optical polarization switch in accordance with claim 13, wherein said compensation means comprises a half-wave retarder having a slow axis oriented substantially parallel to the polarization axis of the incident light.

16. The optical polarization switch in accordance with claim 13, wherein said compensation means comprises an optical rotator effecting substantially 90° rotation of the polarization state of light exiting the first nematic liquid crystal cell.

17. The optical polarization switch in accordance with claim 1, further comprising a voltage source connected so as to switchably provide power to said first and second nematic liquid crystal cells so that said cells at any one time exhibit one of (1) a first state in which said first and second nematic liquid crystal cells are off and a polarization transformation of said first cell substantially cancels out a polarization transformation of said second cell (2) a second state in which one of said first and second nematic liquid crystal cells is on and a polarization transformation of said first and second cells is a net optical effect of a single cell, and (3) a third state in which said first and second nematic liquid crystal cells are on and a polarization transformation of said first cell substantially cancels out a polarization transformation of said second cell.

18. A method for altering a polarization state of incident light having a polarization state along a polarization axis, comprising the steps of:

(a) selectively energizing a first nematic liquid crystal cell arranged in optical series with a second nematic liquid crystal cell;

(b) selectively altering the polarization state of the incident light by passing the incident light through the first nematic liquid crystal cell;

(c) altering the polarization state of the light exiting from the first nematic liquid crystal cell using a compensating means comprising one of an optical rotator effecting substantially 90° of the polarization state of light exiting the first nematic liquid crystal cell an optical half-wave retarder having a slow axis oriented substantially parallel to the polarization axis of the incident light, and an optical half-wave retarder having a fast axis oriented substantially parallel to the polarization axis of the incident disposed between the first and second nematic liquid crystal cells; and (d) selectively energizing the second nematic liquid crystal cell;

(e) selectively altering polarization state of the light exiting from the compensating means using the second nematic liquid crystal cell.

19. The method in accordance with claim 18, wherein the first and second nematic liquid crystal cells are selectively energized so as to exhibit one of (1) a first state in which the first and second nematic liquid crystal cells are off and a polarization transformation of the first cell substantially cancels out a polarization transformation of the second cell (2) a second state in which one of the first and second nematic liquid crystal cells is on and a polarization transformation of the first and second cells is a net optical effect of a single cell, and (3) a third state in which the first and second nematic liquid crystal cells are on and a polarization transformation of the first cell substantially cancels out a polarization transformation of the second cell.

20. The method in accordance with claim 19, wherein the first and second nematic liquid crystal cells are selectively energized so as to sequentially transition through the states whereby any delay while transitioning between the third and first states has substantially no effect on overall efficiency since in both the first and third states the net optical effect is substantially equivalent.

* * * * *